United States Patent
Aubuchon et al.

(10) Patent No.: US 7,170,989 B1
(45) Date of Patent: Jan. 30, 2007

(54) TRANSACTION DEPENDENCY MANAGER

(75) Inventors: Kenneth James Aubuchon, Lenexa, KS (US); Kevin Michael Fallis, Overland Park, KS (US); Kay Ellen Mitchell, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1035 days.

(21) Appl. No.: 10/236,284

(22) Filed: Sep. 6, 2002

(51) Int. Cl.
*H04M 5/00* (2006.01)

(52) U.S. Cl. .................. 379/243; 379/207.02
(58) Field of Classification Search .............. 379/243
See application file for complete search history.

(56) References Cited

U.S. PATENT DOCUMENTS

| | | | | |
|---|---|---|---|---|
| 5,212,789 A | * | 5/1993 | Rago | 707/8 |
| 5,329,589 A | * | 7/1994 | Fraser et al. | 379/91.02 |
| 5,430,719 A | * | 7/1995 | Weisser, Jr. | 370/389 |
| 6,286,011 B1 | * | 9/2001 | Velamuri et al. | 707/104.1 |
| 6,411,604 B1 | * | 6/2002 | Brockman et al. | 370/244 |

* cited by examiner

*Primary Examiner*—Fan Tsang
*Assistant Examiner*—Simon Sing

(57) ABSTRACT

A method and system for efficiently and accurately processing dependent telecommunications-switch transactions is provided. A subset of tables is identified that will be affected by processing each transaction. The subset is referenced to determine which tables to query. A dependency manager associates an order identifier with each transaction and subcomponent thereof. The respective order identifiers are updated as transactions are processed. When the order identifier updates to a 'ready' status, the dependent transaction can be executed.

24 Claims, 4 Drawing Sheets

TRANSACTION DEPENDENCY MANAGER

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention is related to the field of data processing and telecommunications. More particularly, the present invention provides a new and useful method for efficiently processing dependent switch transactions.

BACKGROUND OF THE INVENTION

A telecommunications switch houses information related to a customer's service. A switch has tables within in. These tables contain the data used by various network components to deliver a certain variety of services to a customer. As customers change their services or as other demands may dictate, the various tables within the switches in a communications network must be updated to reflect a customer's preference.

For any number of reasons, switch-update transactions can become backlogged. A line can be severed or a switch's interface capacity surpassed. Transactions are then queued. During this time period, customers may invoke changes to their services from various sources. These changes are typically, but not necessarily, serial in nature. While it is understood that these transactions may be processed in parallel, a parallel solution may be unacceptable when interfacing with one switch when transactions are dependent on others. The final state of the switch will correspond to the last transaction that happened to be processed, possibly erroneously overwriting the correct state if processed in parallel without dependency management. Without dependency ordering, a customer's most recent change request may actually be processed before another change request that could possibly contradict the customer's intentions. Following this scheme, the final state of the switch may not correspond to the most recent change request, therefore forcing a serial solution in certain cases.

Updating a switch becomes difficult when transactions are dependent on other transactions completing first. To provide accurate accounting, billing, and servicing, dependent transactions must be processed after those upon which they depend irrespective of the order in which the transactions are received. Should a customer's preferences be processed out of order, problem diagnosis is displaced onto the consumer in the form of customer complaints. Eventually the problems may possibly be resolved by manually updating the switch. This form of regressive approach to accurate switch updating is time intensive, energy intensive, and costly.

Accordingly, there is a need for a system and method of updating switches accurately, especially where dependent transactions must be processed.

SUMMARY OF THE INVENTION

The present invention solves at least the above problems by providing a system and method for accurately updating telecommunications switches by implementing a dependency manager that resolves transaction dependencies.

In one aspect of the invention, a method for processing telecommunications switch transactions is provided. A transaction to process is received by the system. This transaction could be comprised of one or more table-update instructions. A table-update instruction is any instruction that causes any change to any state of any record of a table or other element in memory. A table-subset identifier is used to indicate the tables that will be affected by the transaction, thereby increasing the efficiency of processing dependent transactions. The table-subset identifier limits queries to those tables that are affected by the transaction. An instruction-status indicator is associated with each instruction to be performed in each table identified by the table-subset identifier. The instruction-status indicator indicates whether the instruction is dependent upon the completion of one or more other transactions and serves as a processing-order identifier. Finally, the transaction is executed if each of the instruction-status indicators indicates that the transaction is ready to be executed. Since one transaction can be made up of multiple instructions, each of the instructions must be in a 'ready' status to execute the transaction.

In another aspect of the invention, a system for efficiently processing dependent switch transactions is provided. A request-receiving component is coupled to a core server, which assigns a processing-order identifier to any subparts of a received transaction and populates a table-subset identifier. The request-receiving component is also coupled to a dependency manager through one or more databases. The dependency manager resolves transaction dependencies and signals when a transaction can be executed.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

Figure 1:
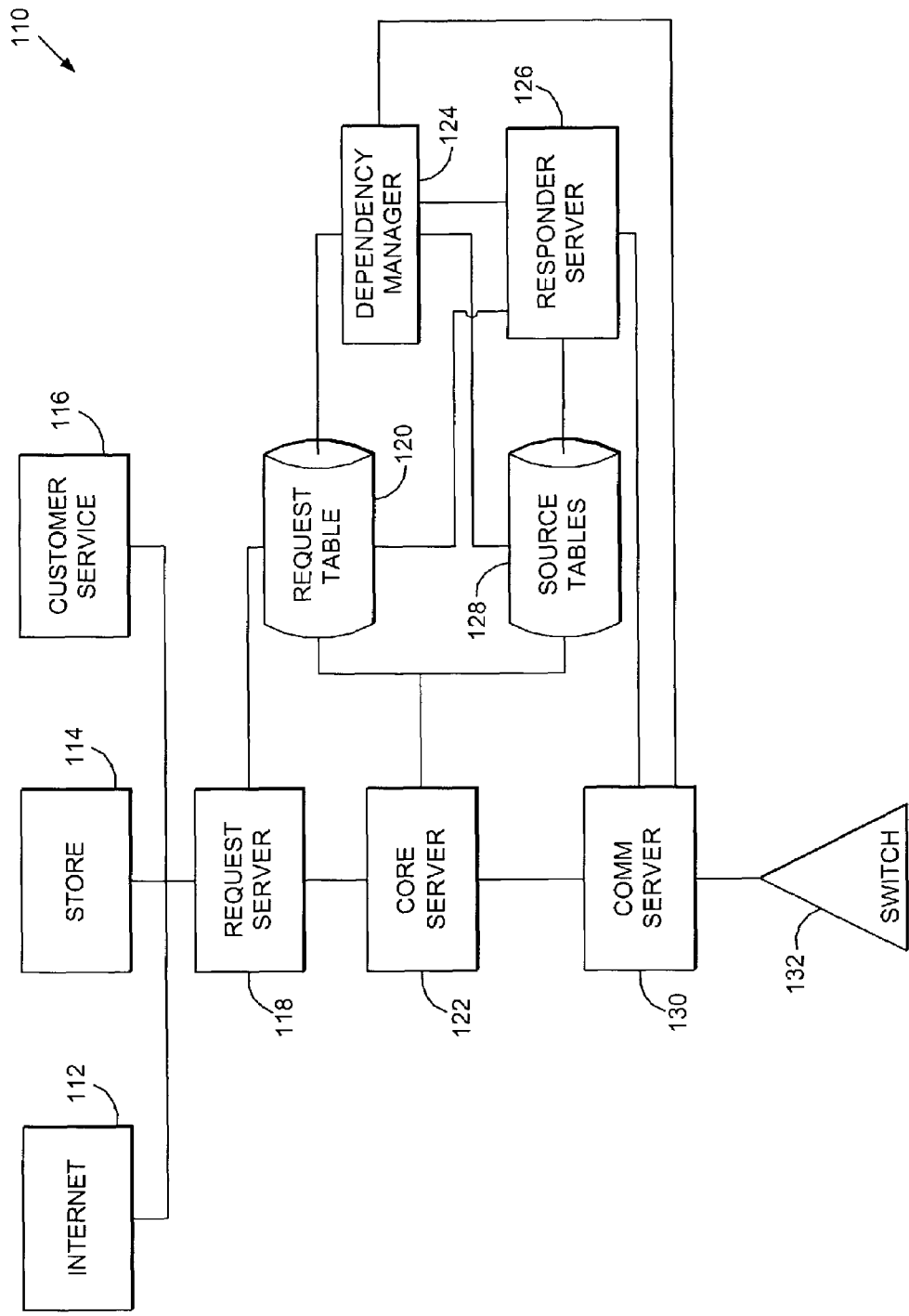
FIG. 1 is a block diagram of an operating environment suitable for practicing the present invention.

The present invention is directed to a system and method for efficiently and accurately executing switch transactions, even when those transactions are dependent on others. Various technical terms are used throughout this disclosure. An aid to defining such terms is *Newton's Telecom Dictionary*, 18th Updated and Expanded Edition (2002) by Harry Newton. These definitions are intended to provide a clearer understanding of the ideas disclosed herein but are in no way intended to limit the scope of the present invention. The definitions and terms should be interpreted broadly and liberally to the extent allowed by the art and the meaning of the words offered in the above-cited reference.

The present invention will be described more fully with reference to the accompanying figures, in which various exemplary embodiments of the invention are shown. The present invention should not be construed as limited to those embodiments. Rather, the described embodiments are illustrative in nature.

As one skilled in the art will appreciate, the present invention may be embodied as, among other things: a method, a data-communications system, or computer-program product. Accordingly, the present invention may take the form of a hardware embodiment, a software embodiment, or an embodiment combining software and hardware. The present invention may take the form of a computer-program product that includes computer-useable instructions embodied on a computer-readable medium.

Computer-readable media include both volatile and nonvolatile media, removable and nonremovable media and contemplates media readable by a database, a switch, and various other network devices. Network switches and related components are conventional in nature; as is means of communicating with the same. By way of example, and not limitation, computer-readable media may comprise computer-storage media and communications media.

Computer-storage media include media implemented in any method or technology for storing information. Examples of stored information include computer-useable instructions, data structures, program modules, and other data representations. Computer-storage media include, but are not limited to: RAM, ROM, EEPROM, flash memory or other memory technology, CD-ROM, digital versatile disks (DVD), holographic media or other optical disk storage, magnetic cassettes, magnetic tape, magnetic disk storage, and other magnetic storage devices.

Communications media typically embody computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communication media include: wired media, such as a wired network or direct-wired connection, and wireless media such as acoustic, infrared, radio, microwave, spread-spectrum, and other wireless media technologies. Combinations of the above are included within the scope of computer-readable media.

Turning now to FIG. 1, an exemplary operating environment suitable for practicing the present invention is provided and referenced generally by numeral 110. Although certain names of components provided in operating environment 110 are included, those names convey the functionality carried out by the various components and are not intended to limit the scope of the present invention. In order to best understand the invention, a detailed illustration will be provided. The examples included herein illustrate the spirit and scope of the invention.

Multiple requests to turn on or off different services associated with a single telephone number can be completed by the present invention. As used herein, a "request" is carried out by a transaction. A transaction can be comprised of multiple instructions. Typically an instruction is used to update a table within a switch. Accordingly, one transaction can include multiple instructions, which are associated with updates on various tables within a telecommunication switch.

With further reference to FIG. 1, three exemplary sources of a request to change a service are provided. The three different sources, although not the only sources, include receiving a request from the Internet 112, a store 114 or via a customer service department 116. This illustrates the concept that a user or group of users who, for purposes of this example, share a telephone line and request changes to the line that services them. In this example, four requests will be made of the same phone number. The switch is updated consistent with the most recent request.

Logically coupled to each of the various request-receiving components is a request server 118. A request table 120 is logically coupled to the request server 118, a core server 122, a dependency manager 124, and a responder server 126. The functionality of each of these components will be explained in greater detail below. The dependency manager 124 is also coupled to a group of source tables 128 as well as to a communications server 130 (comm server), which is finally coupled to a telecommunications switch 132. Subcomponents of switch 132 may include, but are not limited to: input/output devices, a display, a processing unit, internal system memory, as well as a suitable system bus for coupling together the various internal system components and for connecting these components to external devices. These individual components and subcomponents are not shown because of their conventional nature.

The source tables 128, are internal tables that are used by the present invention and represent the data that are in the tables on the switch 132. The source tables 128 do not necessarily mirror the tables in switch 132 but do contain enough information for the present invention to recreate all the data in the table of switch 132. The source tables contain the data used to update switch 132. As previously mentioned, switches contain many tables. The tables illustrated on FIG. 1A do not reside in the switch. Dependency management is performed outside of the switch using tables that represent the data in the switches. Although these tables typically are not identical to the tables in the switch, in most cases they do contain information that can be used to derive the data in the switches.

Although a more detailed process flow will be provided, a general introduction to the functionality of the components in operating environment 110 is provided here.

Request server 118 receives a request. It allocates a transaction number to the request and inserts a record in request table 120 with a blank table-subset identifier and a transaction number. The transaction can contain multiple instructions, which can affect multiple tables. Request server 118 passes the transaction detail to core server 122.

Core server 122 determines what tables will be affected by the transaction. It creates and inserts records into the corresponding status maps for the given key (i.e., telephone number) in the status map. A status map is used in one embodiment of the invention to provide instruction-status indicators, which designate an order for processing instructions. Accordingly, an instruction's status is a processing-order identifier. A processing-order identifier can take on many forms; a status is merely one example. Those skilled in the art will appreciate the wide range of possibilities to associate an order indicator with an instruction. In this embodiment, digits are used to designate statuses. Numbers greater than zero indicate historical data, zero represents a current transaction, and a negative one ('−1') indicates a ready status. Transactions with indicators less than '−1' represent transactions not ready for processing. An exemplary status map follows:

TABLE I

| TRAN | STATUS |
|---|---|
| TR_50 | −0 |
| TR_51 | −1 |
| TR_100 | −2 |

Per Table I above, transaction TR_51 is in a ready status and TR_100 will not be in a ready status until transaction TR_51 completes. Thus, transaction TR_100 has a status of '−2.' The status map of Table I may be tied to a certain attribute, such as call waiting. Thus, three transactions are shown in Table I that affect the call-waiting feature for a given phone number. A corresponding switch table or tables will also be affected. The switch table in this example will be the one that controls the call-waiting feature for the given phone number. The transactions, illustrated in the exemplary status map of Table I, are related by key. As with all the illustrations used herein, the key is a single phone number. The key does not have to be a single phone number but is here since it simplifies the examples. There may hundreds or thousands of transactions, but only two or three (or many more) that relate to a single phone number. Thus, in Table I, transactions TR_50, TR_51 and, TR_100 represent three transactions (which could each contain multiple instructions) to be performed on a switch for a single telephone number. A key could be expanded to cover a group of phone numbers, the entire contents of a switch, or multiple network components.

IF any records exist for the key, core server 122 determines the lowest status record and assigns a status one less than the lowest. If the lowest status found is '−5' the new instruction is given a status of '−6'. If no records are found for that key, then a ready status '−1' is inserted into the status map. Once the respective status maps have the necessary records inserted for a given transaction, core server 122 updates the corresponding bytemap.

A bytemap is one form of a table-subset identifier. A bytemap serves the purpose of limiting the number of tables to query. Those skilled in the art will appreciate that many alternatives to using a bytemap exist for denoting which tables from a group will be affected. A list of the relevant tables could be generated. A specific cell in a table could be flagged. A bytemap is provided herein as an exemplary component for designating which tables will be affected by a given transaction. A sample bytemap follows in Table II:

TABLE II

| TRAN | TBL_A | TBL_B | TBL_C | TBL_D |
|---|---|---|---|---|
| TR_100 | 1 | 0 | 1 | 1 |

A value of '1' in the bytemap means that the corresponding table will be affected, '0' means it will not be affected. Per Table II above, transaction TR_100 will affect Status Maps A, C, and D. If core server 122 determines that all the status maps for a given transaction reflect a ready status, it will send the transaction to comm server 130 to be processed in the switch 132. Otherwise, the transaction record will be marked as pending in the comm server 130 and the comm server 130 waits to process the transaction until dependency manager 124 determines that all dependencies have been satisfied, namely that all instructions associated with a given transaction are in a ready status.

Each transaction is allocated a record in comm server 130. If the record can be sent to the switch, then it will be sent with an 'approved' status, which can be denoted as a '1.' There are many ways denoting an approved status, using the numeral '1' is merely an example. If the record has dependencies, it will be placed in the comm server 130 with a 'P' pending state, meaning that it is not to be sent to the switch. After comm server 130 processes an approved record, it communicates the resulting switch activity to responder server 126.

Responder server 126 receives the transaction number and queries each table based on its corresponding bytemap. For each table queried, a key is obtained. In this example, the key is a telephone number. Every record associated with this key will have its status incremented by one. Responder server 126 determines whether any records rolled to a ready state. For each key where instruction statuses were rolled, responder server 126 determines if there were any records with an instruction status of '−1.' Each transaction number found (that was associated with the key) in a ready status is inserted into a list to be sent to dependency manager 124.

Dependency manager 124 receives the list and begins processing each transaction. The corresponding bytemap is referenced to determine the tables that a transaction will affect. If all records in the corresponding status maps are in a ready status '−1,' dependency manager 124 updates the comm server record from a pending status to an approved status. If dependency manager 124 finds any records in the status maps for the transaction that are not ready, it leaves the transaction to be executed at a later time. Dependency manager 124 may find that the transaction is not pending. This could be the result of another dependency manager 124 or a previous transaction having sent it to comm server 130. In this case, dependency manager 124 does not continue processing that transaction.

Having briefly described an embodiment of the invention, this and similar embodiments will be explained in greater detail.

Immediately below, Table III depicts an illustrative table that resides in switch 132 for purposes of this example.

TABLE III

| PHONE NUMBER | CW | VM | IA | SD |
|---|---|---|---|---|
| 816-555-1111 | 1 | 0 | 1 | 0 |
| 913-555-2222 | 1 | 1 | 1 | 0 |
| 816-555-3333 | 0 | 1 | 0 | 0 |

Reference has been made to switch tables that could be affected by processing a transaction. Table III illustrates one such table. Table III shows various features associated with three phone numbers. The abbreviations correspond to features (CW—Call Waiting; VM—Voice Mail; IA—Internet Access; and SD—Speed Dial). Table III shows that for phone number "816-555-1111," Call Waiting is turned on (represented by a number one), Voice Mail is off, Internet Access is on, and Speed Dial is off. Table III represents an actual table within a switch, such as switch 132. Switch 132 has many more tables. Preferably, a switch table is updated as few times as possible. Rolling statuses and determining if transactions are ready to be processed is considered back-end processing. All the processes used in formulating a switch-update command are considered front-end processing. This invention improves, among other things, back-end processing.

Table IV, immediately below, illustrates a bytemap grid for a single phone number.

TABLE IV

| BYTEMAP | TRAN | WILL AFFECT STATUS MAP... (1 = YES, 0 = NO) | | | |
| --- | --- | --- | --- | --- | --- |
| | | A | B | C | D |
| BM_1 | TR_35 | 0 | 1 | 0 | 0 |
| BM_2 | TR_50 | 1 | 0 | 1 | 1 |
| BM_3 | TR_51 | 1 | 0 | 0 | 0 |
| BM_4 | TR_52 | 0 | 0 | 1 | 0 |
| BM_5 | TR_100 | 1 | 0 | 1 | 1 |

Five bytemaps are shown in Table IV: BM_1, BM_2, BM_3, BM_4, and M_5. As previously explained, a bytemap is an example of a table-subset identifier, which is used to determine what switch tables and status maps will be affected by a transaction. For instance, bytemap BM_1 illustrates that for transaction TR_35 only Status Map_B (described in greater detail below) will be affected by processing transaction TR_35. BM_2 illustrates that for transaction TR_50, Status Maps A, C and D will be affected by executing it. The bytemap grid does not have to, nor does it in this example, provide what the status of the actual switch table will be for the certain phone number. It does provide what status maps will be affected, thus eliminating having to query every status map to determine whether a certain transaction affects it. Status maps are dynamic; the contents vary according to the statuses of various instructions and transactions. In this embodiment, bytemaps are static and are not updated.

The bytemap grid of Table IV represents only one way of providing a table-subset identifier. The table-subset identifier performs the function of limiting queries or table hits to only those tables that will be affected by a specific transaction. For example, in switch 132, tens or hundreds of tables could be potentially associated with a certain telephone number. For instance, one table per service offered by a telecommunications carrier could possibly be affected by carrying out a specific transaction. That is, a separate table in switch 132 could exist for call waiting, voicemail, speed dial, Internet access, automatic-number identification, 3-way calling, call-waiting ID, distinctive-tone ringing, and so on. It is also possible for switches to arrange data in alternative forms, which are contemplated within the scope of the present invention.

With further reference to Table IV above, bytemap BM_3 shows that Status Map A will be affected by processing transaction TR_51. Bytemap BM_4 shows that Status Map C is the only map that will be affected by processing transaction TR_52. Finally, bytemap BM_5 illustrates that Status Maps A, C and D will be affected by processing transaction TR_100.

Updating a table includes inserting a row, modifying the contents within a certain row, deleting a row, or anything that changes the state of a given table. By utilizing a specific bytemap, superfluous processing is reduced and as well as overall completion time by limiting the number of tables that must be queried. Those tables are limited to the tables delineated in a specific bytemap. As previously mentioned, a bytemap is only one form of table-subset identifier. Those of ordinary skill in the art will appreciate alternatives such as including a list of tables to be affected or inverting the ones and zeros included in bytemap grid of FIG. 1C. In all of these situations, the range of possible tables that are queried is reduced to only a select number of tables, those that will be affected by completing a specific transaction.

Figure 2:
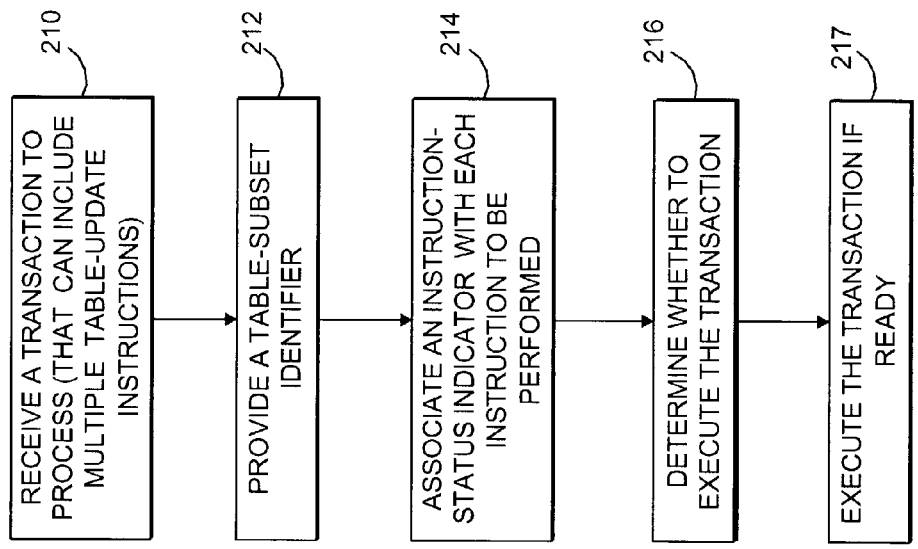
FIG. 2 is flow diagram illustrating a high-level overview of an exemplary method from processing dependent transactions.

Turning now to FIG. 2, an exemplary process for managing depending transactions is provided. At a step 210 a transaction is received. This transaction can include multiple table-update instructions. As previously mentioned, a table-update instruction could include a telecommunications-switch update, a switch-status change request, or any other instruction that causes a change to a telecommunications switch. The present invention has the ability to handle requests coming from multiple sources such as the Internet 112, store 114 or customer service 116. Continuing in our current example, the present invention will be explained with respect to multiple persons requesting multiple changes to a single telephone line. For example, one person may request that a change be made to call waiting, Internet access and speed dialing, whereas another person from another source may request a change to call waiting only. Still yet, another person may request a change to Internet access. Finally, a change may be requested that would affect call waiting, Internet access and speed dial. These transactions are reflected in bytemaps BM_2 through BM_5.

Accordingly, a first request transaction TR_50 is received via the Internet 112. Transaction TR_50 will affect Status Maps A, C and D, which is reflected in bytemap BM_2. Accordingly, at a step 212 a table-subset identifier is provided. Here, the table-subset identifier is bytemap BM_2. The request server 118 receives the request and assigns transaction number '50' to the request, resulting in the formation of transaction TR_50. The request server 118 initializes the bytemap to all zeros and inserts data for the request into request table 120. Request server 118 sends the request to core server 122. At a next step 214, an instruction-status indicator is associated with each instruction to be performed. Transaction TR_50 is comprised of three instructions, which will affect Status Maps A, C, and D. Core server 122 updates the appropriate source tables 128 with transaction data and sets the correct bytes in bytemap. Bytemap BM_2 can now be used throughout the remainder of the process to limit the scope of the respective.

At a step 216 a determination is made as to whether to execute the transaction. Executing this transaction can include sending the transaction to the switch to update the appropriate tables. If the transaction is ready, it is executed at a step 217. If the instruction is not in a ready state, core server 122 sets the transaction in a 'P' pending state and waits for the next message from request server 118.

Figure 3A:
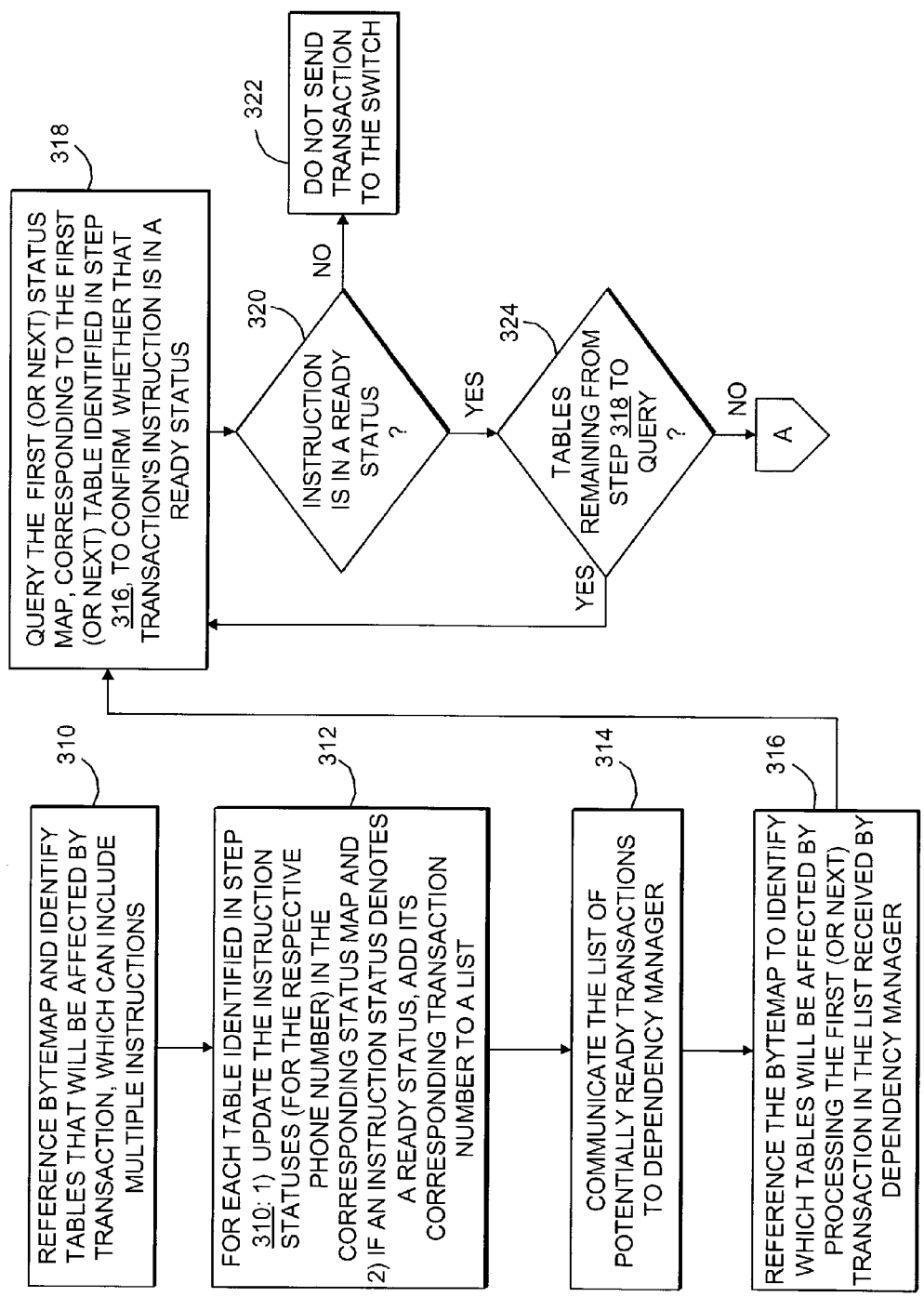
FIG. 3A is more detailed flow diagram illustrating a specific example of processing a series of dependent transactions.

Turing now to FIG. 3A, a detailed process of how the present invention would execute transactions in specific status maps is provided. The process begins with reference to Table V below:

TABLE V

| STATUS MAP A | | STATUS MAP B | | STATUS MAP C | | STATUS MAP D | |
|---|---|---|---|---|---|---|---|
| TRAN | STAT | TRAN | STAT | TRAN | STAT | TRAN | STAT |
| TR_50 | −1 | TR_35 | 0 | TR_50 | −1 | TR_50 | −1 |
| TR_51 | −2 | | | TR_52 | −2 | TR_100 | −2 |
| TR_100 | −3 | | | TR_100 | −3 | | |
| | | | | | | Start - TR_50 ready | |

Table V depicts four Status Maps: A, B, C and D. Each status map contains instructions, which are subparts of a single transaction. Transaction TR_50 has three instructions, which will affect Status Maps A, C, and D. This is reflected in TR_50's bytemap BM_2 (see Table IV). Each status map corresponds to different features of a phone line. Status Map A may relate to the call-waiting feature of a phone number. Thus, there are three transactions (TR_50, TR_51, and TR_100) that affect the call waiting feature of a certain telephone number; one transaction (TR_35) that will affect the voice-mail feature; three transactions (TR_50, TR_52, and TR_100) that will affect the Internet-access feature; and two transactions (TR_50 and TR_100) that will affect the speed-dialing feature.

Table V reflects transaction TR_50 in the process of completing. TR_35 is already complete, as indicated by a status of '0' in Status Map_B. TR_50 is ready to be sent to the update process. But not all instruction statuses will be updated—only those marked by TR_50's bytemap, BM_2 (1, 0, 1, 1). BM_2 indicates (by '1's) that only Status Maps A, C, and D will be affected by transaction TR_50. Accordingly, only the instruction statuses of Status Maps A, C, and D will be updated. In the example of this embodiment, updating statuses involves incrementing each status by one. Many variations on this theme are possible without departing from the scope of the present invention. Those skilled in the art will appreciate using some sort of indicator to identify an instruction ready to be processed and some way of updating those indicators. Here, digits are used as instruction-status indicators and they are updated via incrementing, or rolling. A '−1' indicates that an instruction is in a ready status. Those above zero represent historical changes and those less than '−1' are instructions waiting to be processed.

As the respective Status Maps (A, C, and D) are updated, the application determines whether any instruction statuses roll to a ready status. If so, its transaction number is added to a list. With further reference to FIG. 3A, at a step 310, the bytemap of the transaction is referenced to identify to the status maps that will be affected by the transaction. Here, bytemap BM_2 indicates that Status Maps A, C, and D will be affected by transaction TR_50. At a step 312, each of the corresponding Status Maps will be updated and a list will be made of transaction numbers for the instructions that rolled to a ready status. Table VI shows the status maps after TR_50 is processed:

TABLE VI

| STATUS MAP A | | STATUS MAP B | | STATUS MAP C | | STATUS MAP D | |
|---|---|---|---|---|---|---|---|
| TRAN | STAT | TRAN | STAT | TRAN | STAT | TRAN | STAT |
| TR_50 | 0 | TR_35 | 0 | TR_50 | 0 | TR_50 | 0 |
| TR_51 | −1 | | | TR_52 | −1 | TR_100 | −1 |
| TR_100 | −2 | | | TR_100 | −2 | | |
| | | | | | | TR_50 complete | |

Again, only the statuses in Status Maps A, C, and D were updated because those were the only tables flagged by TR_50's bytemap BM_2 (1,0,1,1). Also, the following list of transaction numbers was generated: {TR_51, TR_52, TR_100}. These transaction numbers had instruction statuses that rolled to a ready status '−1.' At a step 314, this list is communicated to dependency manager 124 and provides the basis for the transactions to attempt to complete. TR_50 can now be sent to the switch.

Parallel processing is contemplated within the scope of the present invention. It does not matter upon which transaction processing begins because if all of the corresponding transaction instructions are not in a ready status, the transaction is not allowed to go to the switch. To continue with the example, the bytemap for the first transaction identified in the list received by dependency manager 124 is referenced to identify which tables will be affected by the transaction at a step 316. Referencing a bytemap does not necessarily mean returning to and querying the bytemap. The phrase "referencing" contemplates sending the necessary data along with the transaction or various other ways to communicate the information represented by the bytemap: namely, which tables will be affected by processing the transaction. TR_51's bytemap is BM_3:

| TR_51 | 1 | 0 | 0 | 0 |
|---|---|---|---|---|

Bytemap BM_3 indicates that only Status Map A will be affected by processing transaction TR_51, since a '1' occurs only in the position marking Status Map A. Each status map identified in the bytemap (step 316) will be queried to confirm that the transaction really is in a ready status; that is, each instruction of the transaction is in a ready status at a step 318. Accordingly, Status Map A is queried for a transaction with a status of '−1' and transaction number of TR_51 (for the certain phone number). An indication is returned that the record sought exists. For example, the actual transaction could be returned or a 'TRUE.' Either response indicates that for Status Map A, transaction TR_51 is in a ready status.

Figure 3B:
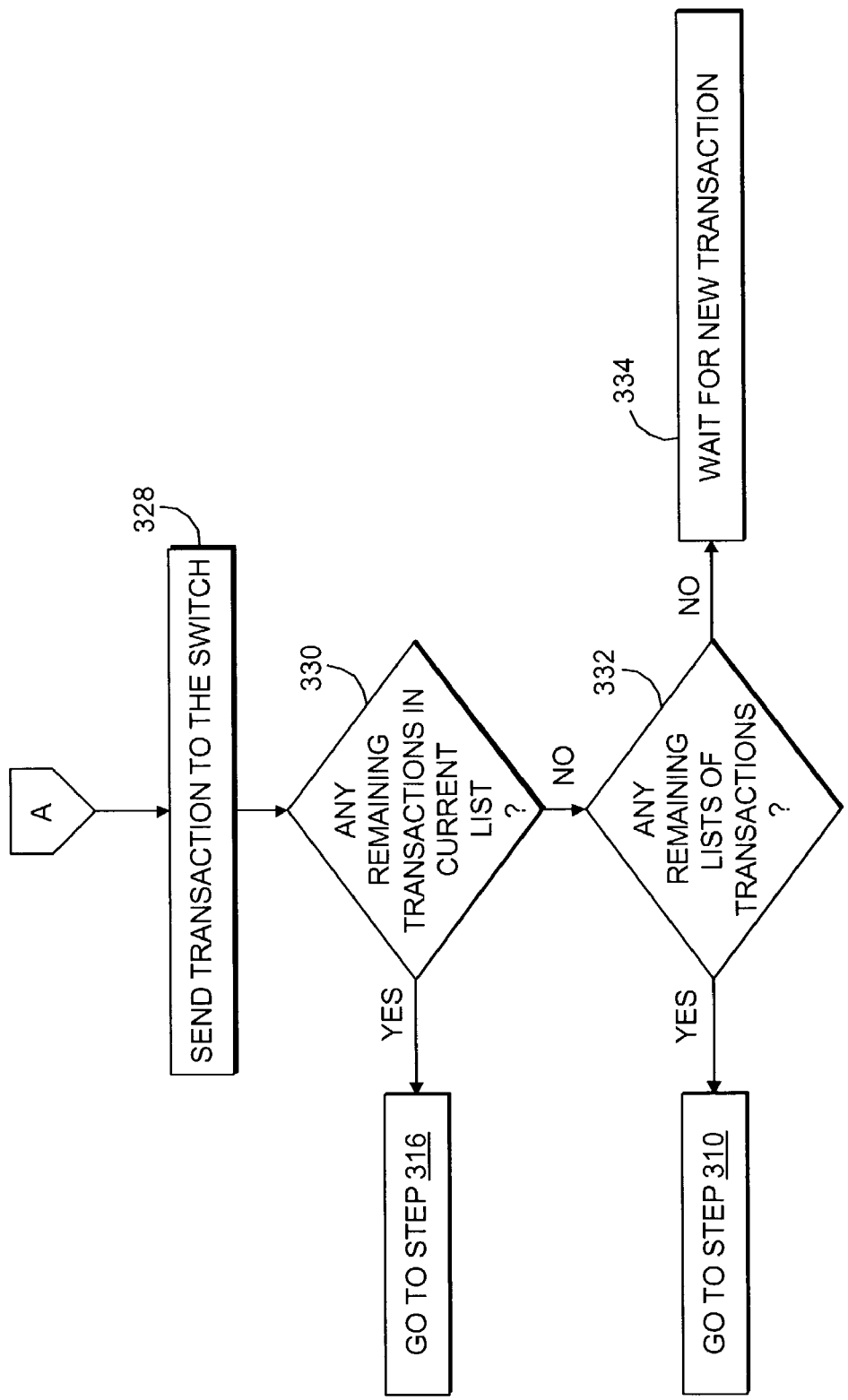
FIG. 3B is a continuation of the flow diagram of FIG. 3A.

Having found a TR_51 in a ready status, a determination is made as to whether there are any remaining status maps (from step 318) to query at a step 324. For transaction TR_51, there are no remaining status maps to query. Processing continues with reference to FIG. 3B at a step 328 and the transaction is sent to the switch. After the transaction completes in the switch, the comm server 130 sends transaction TR_51 to the responder server 126 which starts over at step 310, where the instruction statuses for each table of the current transaction are updated and a new list of transaction numbers whose instruction's status rolled to 'ready' is made. Thus, the instruction statuses in Status Map A are incremented, producing the status maps indicated below in Table VII.

TABLE VII

| STATUS MAP A | | STATUS MAP B | | STATUS MAP C | | STATUS MAP D | |
|---|---|---|---|---|---|---|---|
| TRAN | STAT | TRAN | STAT | TRAN | STAT | TRAN | STAT |
| TR_50 | 1 | TR_35 | 0 | TR_50 | 0 | TR_50 | 0 |
| TR_51 | 0 | | | TR_52 | −1 | TR_100 | −1 |
| TR_100 | −1 | | | TR_100 | −2 | | |
| | | | | | | TR_51 complete | |

Also in step 310, transaction TR_100 was added to a new list (comprised only of TR_100) to be sent to dependency manager 124. For the sake of simplicity, dependency manager 124 now has two lists: {TR_51, TR_52, TR_100} and {100}. Because parallel processing is both possible and contemplated by the present invention, lists of transactions can be processed out of order. At a step 330, a determination is made as to whether there are any remaining transactions in the current list: {TR_51, TR_52, TR_100}. Two transactions remain: TR_52 and TR_100. Thus, processing reverts to step 316.

Completing transaction TR_52 produces the status maps reflected in Table VIII below and sends a list {TR_100} to dependency manager 124.

TABLE VIII

| STATUS MAP A | | STATUS MAP B | | STATUS MAP C | | STATUS MAP D | |
|---|---|---|---|---|---|---|---|
| TRAN | STAT | TRAN | STAT | TRAN | STAT | TRAN | STAT |
| TR_50 | 1 | TR_35 | 0 | TR_50 | 1 | TR_50 | 0 |
| TR_51 | 0 | | | TR_52 | 0 | TR_100 | −1 |
| TR_100 | −1 | | | TR_100 | −1 | | |
| | | | | | | TR_52 complete | |

Table VIII above illustrates that only the statuses of Status Map C were updated. This is correct and efficient because TR_52's bytemap BM_4 informed the system that only Status Map C was to be updated. BM_4 of Table IV is reproduced below.

| | | | | |
|---|---|---|---|---|
| TR_52 | 0 | 0 | 1 | 0 |

Querying all of the available status maps and other tables to determine whether each status map dealt with TR_52 is not necessary because bytemap BM_4 sufficiently denotes all tables that will be affected by transaction TR_52. More processing time is saved by not having to determine whether TR_52 is in a ready state in all status maps, just in the affected status maps.

Completing transaction TR_100 produces the status maps reflected in Table IX below. No list was sent to dependency manager 124 because no statuses rolled to a ready status.

TABLE IX

| STATUS MAP A | | STATUS MAP B | | STATUS MAP C | | STATUS MAP D | |
|---|---|---|---|---|---|---|---|
| TRAN | STAT | TRAN | STAT | TRAN | STAT | TRAN | STAT |
| TR_50 | 2 | TR_35 | 0 | TR_50 | 2 | TR_50 | 1 |
| TR_51 | 1 | | | TR_52 | 1 | TR_100 | 0 |
| TR_100 | 0 | | | TR_100 | 0 | | |
| | | | | | | TR_100 complete | |

Transaction TR_100's bytemap BM_5 indicates that Status Maps A, C, and D were to be affected by TR_100. Thus, the instruction statuses in those status maps were incremented. With a determination made at step 330 that there are no remaining transactions in the current list, a determination as to whether there are any remaining lists to process is made at step 332. Although there are two lists, {TR_100}, {TR_100}, remaining, transaction TR_100 has been completed and the dependency manager 124 will not continue to process that transaction. Accordingly, the system can now wait for new transactions to process.

From the detailed examples provided above and the following claims, it can be seen that the present invention is well adapted to efficiently process dependent switch transactions. Many different arrangements of the various components depicted, as well as components not shown, are possible without departing from the spirit and scope of the present invention. For example, an alternative embodiment is described below.

Instead of using statuses to denote an order status in the dependency list, timestamps can denote when transactions were received. Statuses are maintained, but the status is one of the following: 'current'=0, 'pending'=−1, and 'history'=1. Accordingly, many records would have a pending status and many would be historical, but only one transaction would be current. In this embodiment, only two records would be affected for any given transaction. The current record is received and its status is rolled to 'history.' There should only be one record to roll. Then a transaction can be selected by querying for the minimum timestamp where status is 'pending' and key is the natural key of table (phone number). This should produce one record. That record is updated to current. Another selection can be made, again from the minimum timestamp to get the next record in line. This transaction would go in the dependency list to be sent to dependency manager 124.

Although the invention was described with respect to processing switch transactions those skilled in the art will understand alternative applications for the present invention.

It will be understood that certain features and subcombinations are useful, may be employed without reference to other features and subcombinations, and are contemplated within the scope of the claims. Not all steps listed in the various figures need be carried out in the specific order described.

What the invention claimed is:

1. A method for processing telecommunications-switch updates, comprising:
   receiving a first transaction to process, comprised of one or more table-update instructions;
   providing a table-subset identifier for determining which tables will be affected by said transaction;
   associating an instruction-status indicator with each instruction to be performed in each table identified by said table-subset identifier, wherein said instruction-status indicator indicates whether said instruction is dependent upon the completion of a second transaction; and
   executing said transaction if each of said instruction-status indicators indicates that said transaction is ready to be executed.

2. The method of claim 1, wherein receiving said first transaction includes receiving a selection from the group comprising:
   a telecommunications-switch update; and
   a telecommunications switch status-change request.

3. The method of claim 2, said table-subset identifier includes a representation of tables that will be affected by executing said first transaction, wherein said representation includes a portion of a larger group of tables that would otherwise be referenced but for said table-subset identifier.

4. The method of claim 3, wherein said representation of tables includes:
   an array of data, wherein tables that will be affected by said transaction are marked by a first character string and tables that will not be affected by said transaction are marked with a second character string;
   a list of tables that will be affected by said transaction; and
   a list of tables that will not be affected by said transaction.

5. The method of claim 4, wherein said instruction-status indicator includes a selection from the group comprising: a number, a character string, an alphanumeric sign, and a time stamp.

6. The method of claim 5, wherein executing said transaction includes:
   by referencing said table-subset identifier, updating the instruction-status indicators for only those tables that will be affected by said transaction;
   determining a tentatively-ready instruction that will affect the first table identified in said table-subset identifier; and confirming that said tentatively-ready instruction is actually ready by progressively determining it is in a ready status for each table remaining in said table-subset identifier.

7. The method of claim 6, wherein executing said transaction further comprises:
   if said transaction is not ready to be executed, repeating said step of updating each of said instruction-status indicators and subsequent steps as other transactions upon which said transaction is dependent are processed until said transaction is ready to be executed.

8. A machine-readable medium containing machine-useable instructions embodied thereon for causing one or more machines to perform a method for processing telecommunications-switch updates, said method comprising:
   receiving a first transaction to process, comprised of one or more table-update instructions;
   providing a table-subset identifier for determining which tables will be affected by said transaction;
   associating an instruction-status indicator with each instruction to be performed in each table identified by said table-subset identifier, wherein said instruction-status indicator indicates whether said instruction is dependent upon the completion of a second transaction; and
   executing said transaction if each of said instruction-status indicators indicates that said transaction is ready to be executed.

9. The machine-readable medium of claim 8, wherein receiving said first transaction includes receiving a selection from the group comprising:
   a telecommunications-switch update; and
   a telecommunications switch status-change request.

10. The machine-readable medium of claim 9, said table-subset identifier includes a representation of tables that will be affected by executing said first transaction, wherein said representation includes a portion of a larger group of tables that would otherwise be referenced but for said table-subset identifier.

11. The machine-readable medium of claim 10, wherein said representation of tables includes:
   an array of data, wherein tables that will be affected by said transaction are marked by a first character string and tables that will not be affected by said transaction are marked with a second character string;

a list of tables that will be affected by said transaction; and a list of tables that will not be affected by said transaction.

12. The machine-readable medium of claim 11, wherein said instruction-status indicator includes a selection from the group comprising: a number, a character string, an alphanumeric sign, and a time stamp.

13. The machine-readable medium of claim 12, wherein executing said transaction includes:

by referencing said table-subset identifier, updating the instruction-status indicators for only those tables that will be affected by said transaction;

determining a tentatively-ready instruction that will affect the first table identified in said table-subset identifier; and confirming that said tentatively-ready instruction is actually ready by progressively determining it is in a ready status for each table remaining in said table-subset identifier.

14. The machine-readable medium of claim 13, wherein executing said transaction further comprises:

if said transaction is not ready to be executed, repeating said step of updating each of said instruction-status indicators and subsequent steps as other transactions upon which said transaction is dependent are processed until said transaction is ready to be executed.

15. A method for processing dependent switch transactions, comprising:

determining from a plurality of switch transactions which transactions are dependent transactions;

identifying related transactions upon which said dependent transactions depend;

assigning a processing-order identifier to said dependent transactions; and executing said dependent transactions in an order prescribed by said processing-order identifier.

16. The method of claim 15 wherein determining which transactions are dependent transactions includes creating a status map of transactions, wherein said status map associates an instruction-order identifier with a plurality of instructions that, when processed, will affect a first table.

17. The method of claim 16 wherein identifying related transactions upon which said dependent transactions depend includes creating a table identifier that denotes the tables that will be affected by processing said dependent transactions.

18. The method of claim 17, wherein said table identifier includes a table bytemap.

19. The method of claim 18, wherein assigning a processing-order identifier to said dependent transactions includes populating said status map with said processing-order identifier.

20. The method of claim 19, wherein executing said dependent transactions includes communicating said transaction to a telecommunications switch.

21. A system for processing dependent telecommunications-switch transactions, comprising:

a transaction-receiving component for receiving a plurality of switch transactions, wherein a first portion of said transactions are dependent on a second portion of said transactions to complete;

an order-identifying component for associating a processing-order identifier with each of said dependent transactions;

a table-subset identifier for identifying tables that will be affected by processing said dependent transactions; and a transaction-executing component, logically coupled to said transaction-receiving component, said order-identifying component, and said table-subset identifier, for executing said dependent transactions in an order prescribed by said processing-order identifier.

22. The system of claim 21, wherein said transaction-receiving component includes a request server that assigns a transaction number to each of said plurality of switch transactions.

23. The system of claim 22 where said table-subset identifier includes a bytemap.

24. The system of claim 23, wherein said transaction-executing component includes a dependency-manager component for resolving dependencies between said transactions.

* * * * *